Feb. 25, 1958     H. H. HOELTJE ET AL     2,824,461
SHAFT LATCHING DEVICE AND QUICK DISCONNECT COUPLING
FOR SHAFTS PARALLEL BUT NOT COLINEAR
Filed Feb. 21, 1955
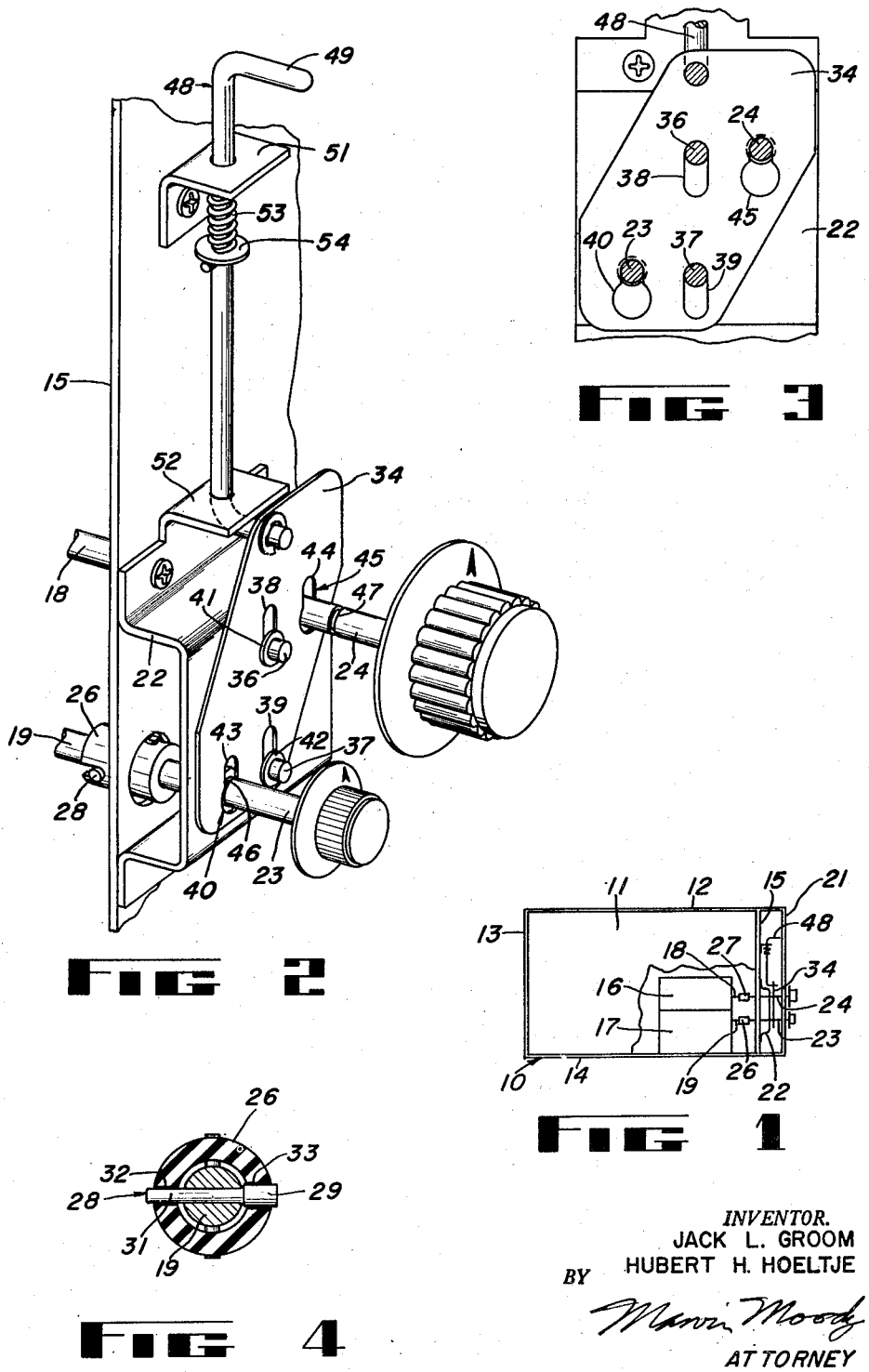
INVENTOR.
JACK L. GROOM
HUBERT H. HOELTJE
BY
*Marvin Moody*
ATTORNEY

United States Patent Office 2,824,461
Patented Feb. 25, 1958

2,824,461

SHAFT LATCHING DEVICE AND QUICK DISCONNECT COUPLING FOR SHAFTS PARALLEL BUT NOT COLINEAR

Hubert H. Hoeltje and Jack L. Groom, Burbank, Calif., assignors to Collins Radio Company, Cedar Rapids, Iowa, a corporation of Iowa Application February 21, 1955, Serial No. 489,464

6 Claims. (Cl. 74—483)

This invention relates in general to a shaft latching device and a quick disconnect coupling for shafts that are parallel but not colinear.

Oftentimes it is desirable to connect a shaft to another shaft very rapidly. For example, modular construction is being used more and more in radio chassis. Such construction comprises building separate units which may be removed and replaced when defective. For example, the intermediate frequency amplifier might be in one unit, the radio frequency amplifier might be in another unit, etc. Oftentimes the layout of the chassis is such that the modules must be dropped down into the chassis, and there may not be room for side or lateral motion in that the hole in which they fit may not allow such motion. Oftentimes it is desirable to connect shafts to such modular units, and since the units cannot be moved sidewise or backward and forward a problem is presented.

It is an object of this invention, therefore, to provide an apparatus for making a quick shaft connection and for locking said shafts in the connected position.

A feature of this invention is found in the provision for a locking plate formed with keyhole slots which may be engaged with grooves formed in shafts.

Further features, objects, and advantages of the invention will become apparent from the following description and claims when read in view of the drawings, in which:

Figure 1 illustrates a radio chassis with the invention installed thereon;

Figure 2 is an enlarged perspective view of the invention;

Figure 3 is a plan view showing the locking plate; and

Figure 4 illustrates the engaging coupler of the apparatus.

Figure 1 illustrates a radio chassis 10 which may have a bottom 11 and side walls 12, 13, 14, and 15, respectively. The chassis 10 may be for a modular constructed radio transmitter-receiver. Certain modules or boxes 16 and 17 may form part of the equipment and may require that shaft inputs be attached to them for tuning purposes. Shafts 18 and 19 are the input shafts of modules 16 and 17 and are shown in Figure 1. It is to be realized that the modules make electrical connection with the remaining portions of the equipment.

Attached to the front wall 15 of the chassis 10 is a cover plate 21. A pair of shafts 23 and 24 extend through this cover plate 21 and also through aligned openings formed in the wall 15 of the chassis.

A bracket 22 is attached to the wall 15 and is also formed with aligned openings through which the shafts 23 and 24 extend. Coupling members 26 and 27 are attached to the inner ends of the shafts 23 and 24 and are engageable with pins 28 carried on the end of the shafts 18 and 19. These pins have large portions 29 and small portions 31 on opposite ends which allow the 180 degree ambiguity to be resolved. The couplers 26 and 27 have a small groove 32 on one side and a large groove 33 on the other side which mate with the pins 28.

When the shaft 23 is extended as far as possible within the confines of the chassis and rotated until the pin 28 engages the grooves 32 and 33 it is capable of rotating shaft 19 in either direction for tuning or other purposes.

For locking the shafts in the engaged position a locking plate 34 is provided which is supported on a pair of guide pins 36 and 37 mounted to the bracket 22 and which extend through slots 38 and 39 formed in the locking plate. Washers 41 and 42 are mounted on the guide pins 36 and 37 and hold the locking plate in place but allow up and down motion thereof. Keyhole slots 40 and 45 are formed in the locking plate 34 and the shafts 23 and 24 extend therethrough. The small portions 43 and 44 of the keyhole slots are too small to allow the locking plate to fall down but a pair of grooves 46 and 47 are formed in the shafts 23 and 24. When these grooves are aligned with the locking plate, the plate may move downward to lock the shafts in the longitudinal direction. A lever 48 is provided for unlocking the locking plate. It has a handle 49 and extends through guide brackets 51 and 52. A spring 53 biases the lever 48 downwardly. It is mounted between the bracket 51 and a washer 54 attached to lever 48.

In operation, suppose that it is desired to remove one of the modules 16 or 17 to replace it. The lever 48 is lifted by hand and the shaft connected to the unit is moved longitudinally out of the chassis. For explanatory purposes, assume that it is shaft 23 which must be disengaged from the shaft 19 to allow the module to be removed. Shaft 23 is moved longitudinally until it is disengaged with shaft 19. Since the groove 46 is no longer beneath the small opening of the keyhole 40, the locking plate 34 will not drop to the locked position. The module may be lifted out of the chassis and a new one placed therein. Then the shaft 23 may be pushed into the chassis until the coupler 26 engages the shaft 19 of the new module. It may be rotated until it locks with the pin 28 of the new shaft. At this time the groove 46 will be aligned with the keyhole 40, thus allowing the locking plate to fall into its locked position to prevent longitudinal motion of the shafts.

It is to be realized that the locking plate 34 will not fall into the locked position until all of the shafts are correctly engaged with the internal shafts. If any one of the shafts is out of engagement with the external shafts the locking plate will not fall.

It is to be realized, of course, that any number of shafts may be so controlled merely by the addition of keyhole slots and controlling shafts. It is seen that this invention provides means for quickly and easily disconnecting shafts. Although it has been described with respect to a particular embodiment thereof, it is not to be so limited as changes and modifications may be made therein which are within the full intended scope of the invention as defined by the appended claims.

1. Means for locking shafts together so they cannot move relative to each other in a longitudinal direction while remaining free to turn comprising, a first plate formed with an opening, a U-shaped bracket attached to said first plate and formed with an aligned opening, a locking plate formed with a pair of slots, guide pins attached to said bracket and extending through said slots a keyhole slot formed in said locking plate, one of said shafts extending through said plate, the bracket and the keyhole slot, a groove formed in said one shaft for engagement with the smaller portion of the keyhole slot, and spring biasing means attached to said locking plate urging the smaller portion of said keyhole slot toward said one shaft.

2. Means for locking a pair of shafts so they cannot move relative to each other in a longitudinal direction while allowing them to rotate freely comprising, coupling means connecting said shafts so that they rotate together, said coupling means allowing said shafts to be disconnected by longitudinal movement relative to each other, a first plate formed with an opening through which one of the shafts extends, a bracket spaced from and attached fixedly to said first plate and formed with an aligned opening through which said one shaft extends, a locking plate slideably connected to said bracket, a keyhole slot formed in said locking plate and said one shaft extending therethrough a groove formed in said one shaft with the diameter of said one shaft being small enough to pass through the larger portion of the keyhole slot but too large to be received in the smaller portion of said keyhole slot, and the grooved portion of said one shaft having a diameter small enough to be received in the smaller portion of the keyhole slot, whereby engagement of the smaller portions of said keyhole slot with said grooved portion holds said one shaft captive in both directions longitudinally.

3. Apparatus according to claim 1 wherein a plurality of aligned openings are formed in the bracket and the first plate and a plurality of keyhole slots are formed in said locking plate so as to simultaneously lock a plurality of said one shafts to prevent them from moving longitudinally while allowing them to rotate.

4. Means for locking a shaft so it cannot move longitudinally while allowing it to rotate freely comprising, a first plate formed with an opening through which the shaft extends, a U-shaped bracket attached to said first plate and formed with an aligned opening through which said shaft extends, a pair of guide pins attached to said bracket, a locking plate formed with a pair of slots through which the guide pins are received, washers attached to said guide pins to hold said locking plate thereon, said locking plate formed with a keyhole slot aligned with the opening formed in said bracket, said shaft extending through said keyhole slot and having a diameter small enough so that it passes through the larger portion of said keyhole slot but being of a diameter large enough so that it will not pass into the confines of the smaller portion of the keyhole slot, and a groove formed in said shaft with a diameter small enough to be received in the smaller portion of the keyhole slot, whereby said smaller portion of the keyhole slot entered into said groove holds said shaft captive as to motion in either direction axially.

5. Means for locking a shaft so it cannot move longitudinally while allowing it to rotate freely comprising, a first plate formed with an opening through which the shaft extends, a U-shaped bracket attached to said first plate and formed with an aligned opening through which said shaft extends, a pair of guide pins attached to said bracket, a pair of slots formed in said guide plate and said guide pins received therethrough, washers attached to said guide pins to hold said locking plate thereon, said locking plate formed with a keyhole slot aligned with the opening formed in said bracket, said shaft extending through said keyhole slot and having a diameter small enough so that it passes through the larger portion of said keyhole slot, but being of a diameter large enough so that it will not pass into the confines of the smaller portion of the keyhole slot, a groove formed in said shaft with a diameter small enough to be received in the smaller portion of the keyhole slot, a pair of L-shaped brackets attached to said first plate and formed with aligned openings, a lever extending through the openings in said L-shaped brackets, one end of said lever attached to said locking plate, a handle attached to the other end of said lever, and spring biasing means for biasing said locking plate to the locked position.

6. Means for locking a plurality of shafts so they cannot move longitudinally while allowing them to rotate freely comprising, a first plate formed with openings through which said shafts extend, a U-shaped bracket attached to said first plate formed with aligned openings through which said shafts extend, a pair of guide pins attached to said bracket, a locking plate formed with a pair of slots and said guide pins received therethrough, washers attached to said guide pins to hold said locking plate thereon, said locking plate formed with a plurality of keyhole slots aligned with the openings formed in said bracket, said shafts extending through said keyhole slots and having diameters small enough so that they pass through the larger portion of said keyhole slots, but having diameters large enough so that they will not pass into the confines of the smaller portions of the keyhole slots, a groove formed in said shafts with a diameter small enough to be received in the smaller portion of the keyhole slot, and spring biasing means urging the locking plate to the locked position.

References Cited in the file of this patent

UNITED STATES PATENTS

| | | |
|---|---|---|
| 2,143,401 | Aruin | Jan. 10, 1939 |
| 2,485,223 | Wagenknect | Oct. 18, 1949 |